(No Model.)
E. A. C. PETERSEN.
BAKER'S OVEN.
No. 601,586. Patented Mar. 29, 1898.
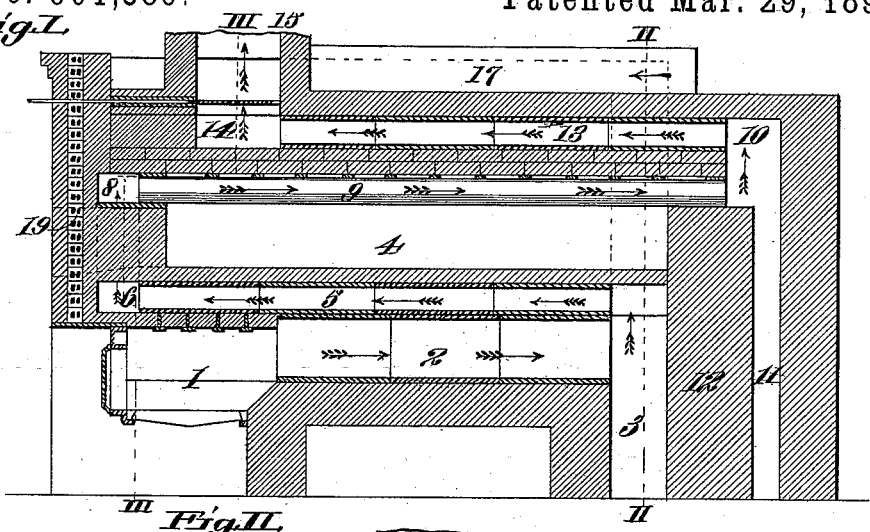
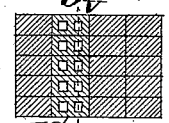
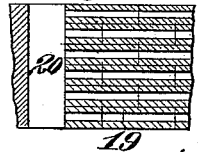
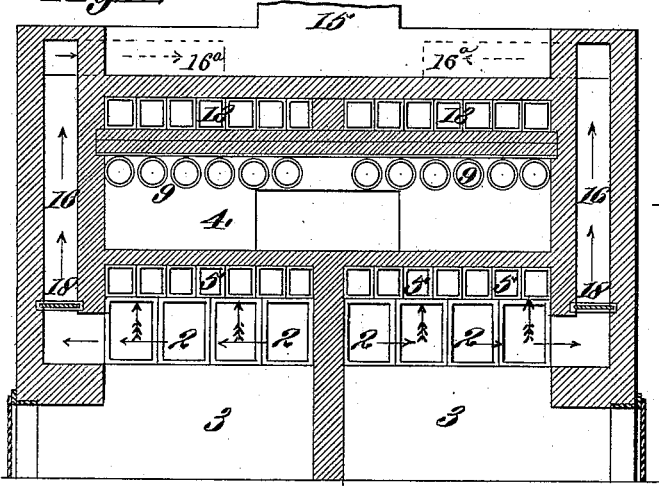
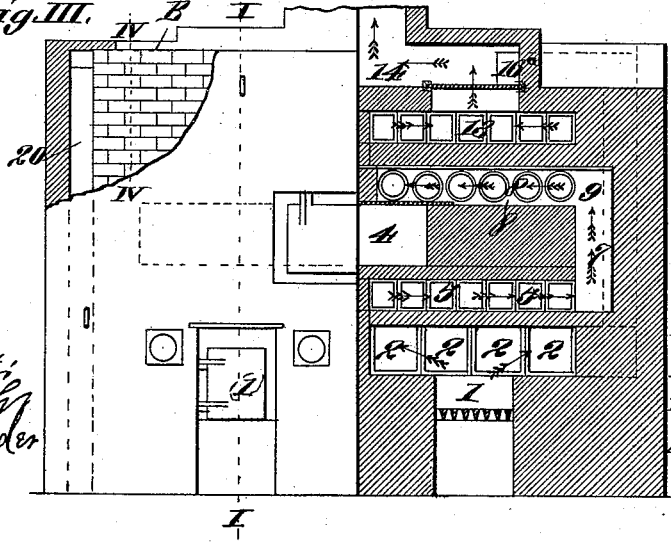
Attest:
E. S. Knight
J. V. Alexander
Inventor:
E. A. C. Petersen,
by Knight Bros.
attys

UNITED STATES PATENT OFFICE.

EDWARD A. C. PETERSEN, OF CHICAGO, ILLINOIS.

BAKER'S OVEN.

SPECIFICATION forming part of Letters Patent No. 601,586, dated March 29, 1898.

Application filed September 30, 1897. Serial No. 653,555. (No model.)

*To all whom it may concern:*

Be it known that I, EDWARD A. C. PETERSEN, a citizen of the United States, residing at the city of Chicago, in the county of Cook and State of Illinois, have invented a certain new and useful Improvement in Bakers' Ovens, of which the following is a full, clear, and exact description, reference being had to the accompanying drawings, forming a part of this specification.

The object of my invention is to produce an oven that can be quickly and economically heated to the temperature necessary for baking bread, &c., and which can be quickly cooled down to the temperature for baking cakes, &c.

My invention has also for its object to improve the details of construction of a baker's oven.

My invention consists in features of novelty hereinafter fully described, and pointed out in the claims.

Figure I is a vertical longitudinal section of my improved oven, taken on the line II, Fig. III. Fig. II is a vertical transverse section taken on the line II II, Fig. I. Fig. III is a like view, part in elevation, taken on the line III III, Fig. I. Fig. IV is a detail vertical longitudinal section taken on the line IV IV, Fig. III. Fig. V is a vertical transverse section taken on line V V, Fig. IV. Fig. VI is an enlarged end view of one of the flue-linings or tiles used to form the lower set of the flues of the oven.

In the drawings I have shown a double oven; but it is evident that it may be built in single form.

1 represents the fire-boxes, which communicate with the longitudinal flues 2, that extend rearwardly to a vertical transverse inner soot-chamber 3, located beneath the inner end of the longitudinal baking-chamber 4, and the upper end of which communicates with forwardly-extending longitudinal flues 5, located on the flues 2 and between the flues 2 and the hearth of the baking-chamber.

The flues 2 and 5 are made of what is known in the trade as "flue-lining fire-clay tiles," the flues 2 being preferably larger than the flues
5. Flues can be thus made very cheaply, can be easily cleaned, as they present a smooth surface, and they offer a minimum resistance to the radiation of heat while the products of combustion are passing therethrough, and they also cool quickly when the temperature of the oven is to be reduced.

As the products of combustion pass through the upper part of the chamber 3 from the flues 2 into the flues 5 soot is deposited in the chamber 3, which may be removed through a suitable opening in one side of the oven. From the flues 5 the heat and products of combustion pass into transverse horizontal flues 6 and thence into vertical flues 7, which conduct them to transverse horizontal flues 8, from whence they pass into longitudinal pipes 9 in the upper part of the baking-chamber, and which conduct the heat and products of combustion into transverse rear flues 10 at the back of the oven. Beneath the flues 10 there is a second vertical transverse outer soot-chamber 11, separated from the baking-chamber 4 and from the chamber 3 by means of a transverse wall 12. As the heat and products of combustion pass through the flues 10 from the pipes 9 soot is deposited in the chamber 11 and may be removed through an opening in one side of the oven. From the flues 10 the heat and products of combustion pass through the forwardly-extending longitudinal flues 13 to a transverse horizontal flue 14 in the upper front part of the oven, and which communicates with the chimney or uptake 15. The flues 13, like the flues 2 and 5, are made of flue-lining, for the reasons given.

With an oven thus constructed the baking-chamber can be quickly and economically heated to the desired temperature, and when it is desired to cool off the baking-chamber—as, for instance, when it has been used for baking bread and it is desired for use in baking cakes—it can be quickly done by causing a circulation of air through the flues. This is accomplished by providing the oven with vertical side flues 16, located, preferably, near the back of the oven and lead to transverse horizontal flues 16ª, which form a communication between the upper part of the chamber 3 and the chimney 15. These flues preferably extend vertically through the side walls of the oven and then forwardly over the top of the oven to the chimney, as shown at 17, Fig. I. They are provided with dampers 18, which are closed during the heating of the oven and the period of baking, and then by opening the dampers 18 and by opening the doors of the baking-chamber the heat is drawn from the baking-chamber and the flues to the chimney. The circulation of the heat and the products of combustion are shown by full arrows in Figs. I and II and the circulation during the cooling process is shown by featherless arrows.

It is desirable for the comfort of the person operating the oven to keep the front wall of the oven as cool as possible, and to accomplish this without weakening the front wall of the oven by leaving a hollow chamber or flue therein, as has heretofore been suggested, I build in the front wall a tier of perforated or hollow bricks 19. (See Figs. I, IV, and V.) The bricks are placed so that the openings extend in a horizontal direction across the oven and open into a vertical flue 20, which may communicate with the chimney or uptake, as shown by dotted lines B in Fig. III, so as to cause a circulation of air through the openings in the bricks 19. The bricks 19 extend entirely across the front of the oven, so as to take in outside air to provide for the circulation.

I claim as my invention—

1. A baker's oven comprising a fire-box, the vertical transverse inner soot-chamber, the longitudinal rearwardly-extending flues providing communication between the fire-box and the inner soot-chamber, the baking-chamber having a thin hearth, the forwardly-extending longitudinal flues located on the rearwardly-extending longitudinal flues and between the latter and the thin hearth of the baking-chamber, and leading from the inner soot-chamber, the vertical side flues, the transverse lower and upper flues respectively beneath and above the baking-chamber connected to the vertical side flues, the rearwardly-extending longitudinal flues located within the top of the baking-chamber, the transverse rear flues with which the flues in the baking-chamber communicate, the vertical transverse outer soot-chambers, beneath the transverse rear flues, the forwardly-extending longitudinal upper flues leading from the transverse rear flues, the uptake, and the transverse front flue connecting the upper flues with the uptake said flues beneath the baking-chamber being made of tiling; substantially as described.

2. A baker's oven comprising a tier of perforated or hollow bricks placed within the front wall of the oven so that the openings extend in a horizontal direction, and vertical flues at the sides of the oven with which the tier communicates; substantially as described.

EDWARD A. C. PETERSEN.

In presence of—
E. S. KNIGHT,
N. V. ALEXANDER.